US010033650B2

(12) United States Patent
Yu et al.

(10) Patent No.: US 10,033,650 B2
(45) Date of Patent: Jul. 24, 2018

(54) PRESERVING QUALITY OF SERVICE ACROSS TRILL NETWORKS

(75) Inventors: Shunjia Yu, San Jose, CA (US); Anoop Ghanwani, Rocklin, CA (US); Phanidhar Koganti, Sunnyvale, CA (US); John Michael Terry, San Jose, CA (US); Wing Cheung, Fremont, CA (US); Joseph Juh-En Cheng, Palo Alto, CA (US); Surya P. Varanasi, Dublin, CA (US)

(73) Assignee: BROCADE COMMUNICATION SYSTEMS LLC, San Jose, CA (US)

( * ) Notice: Subject to any disclaimer, the term of this patent is extended or adjusted under 35 U.S.C. 154(b) by 727 days.

(21) Appl. No.: 13/048,817

(22) Filed: Mar. 15, 2011

(65) Prior Publication Data

US 2011/0299414 A1 Dec. 8, 2011

Related U.S. Application Data

(60) Provisional application No. 61/352,746, filed on Jun. 8, 2010, provisional application No. 61/427,034, filed on Dec. 23, 2010.

(51) Int. Cl.
| | |
|---|---|
| *H04L 12/723* | (2013.01) |
| *H04L 12/66* | (2006.01) |
| *H04J 1/16* | (2006.01) |
| *H04L 12/857* | (2013.01) |
| *H04L 12/46* | (2006.01) |
| *H04L 12/701* | (2013.01) |
| *H04L 12/721* | (2013.01) |

(52) U.S. Cl.
CPC ...... *H04L 47/2491* (2013.01); *H04L 12/4641* (2013.01); *H04L 45/00* (2013.01); *H04L 45/66* (2013.01)

(58) Field of Classification Search
CPC ............... H04L 12/465; H04L 47/2491; H04L 12/4641; H04W 76/027
See application file for complete search history.

(56) References Cited

U.S. PATENT DOCUMENTS

| | | | |
|---|---|---|---|
| 2004/0057437 A1* | 3/2004 | Daniel ................ | H04L 12/5601 370/395.43 |
| 2005/0157751 A1* | 7/2005 | Rabie et al. ................... | 370/466 |
| 2006/0034292 A1* | 2/2006 | Wakayama et al. ....... | 370/395.5 |

(Continued)

*Primary Examiner* — Asad Nawaz
*Assistant Examiner* — Jason Harley
(74) *Attorney, Agent, or Firm* — Shun Yao; Park, Vaughan, Fleming & Dowler LLP

(57) ABSTRACT

Systems and techniques for processing and/or forwarding packets are described. An ingress switch can use a QoS mapping mechanism to map a first set of Quality of Service (QoS) bits in a packet received from a customer to a second set of QoS bits for use in a Transparent Interconnection of Lots of Links (TRILL) packet which encapsulates the packet. The first set of QoS bits can be different from the second set of QoS bits. The TRILL packet can be processed and/or forwarded in the network based on the second set of QoS bits. At the egress switch, the TRILL packet can be decapsulated and the original packet with the original QoS bits (or QoS bits that are different from the original QoS bits) can be forwarded to the customer's network. In this manner, some embodiments of the present invention can preserve the QoS bits across a TRILL network.

22 Claims, 4 Drawing Sheets

(56) References Cited

U.S. PATENT DOCUMENTS

| | | | |
|---|---|---|---|
| 2006/0114904 A1* | 6/2006 | Lee | H04L 12/18 370/390 |
| 2006/0245439 A1* | 11/2006 | Sajassi | 370/400 |
| 2008/0107119 A1* | 5/2008 | Chen et al. | 370/395.21 |
| 2008/0267085 A1* | 10/2008 | Bae | H04L 47/10 370/252 |
| 2008/0310342 A1* | 12/2008 | Kruys et al. | 370/328 |
| 2009/0141740 A1* | 6/2009 | Baruah | H04L 47/10 370/469 |
| 2009/0252049 A1* | 10/2009 | Ludwig et al. | 370/252 |
| 2010/0157788 A1* | 6/2010 | Ellis | H04L 41/064 370/216 |
| 2010/0165995 A1* | 7/2010 | Mehta et al. | 370/400 |
| 2010/0220724 A1* | 9/2010 | Rabie | H04L 47/10 370/392 |
| 2011/0019678 A1* | 1/2011 | Mehta et al. | 370/401 |
| 2011/0110266 A1* | 5/2011 | Li et al. | 370/253 |
| 2011/0134925 A1* | 6/2011 | Safrai | H04L 49/35 370/395.53 |
| 2011/0299534 A1* | 12/2011 | Koganti et al. | 370/392 |

* cited by examiner

PRESERVING QUALITY OF SERVICE ACROSS TRILL NETWORKS

RELATED APPLICATION

This application claims priority to U.S. Provisional Application No. 61/352,746, entitled "Preserving Quality of Service Across TRILL and Q-in-Q Networks," by inventors Shunjia Yu, Anoop Ghanwani, Phanidhar Koganti, John Michael Terry, Wing Cheung, Joseph Juh-En. Cheng, and Surya P. Varanasi, filed 8 Jun. 2010, the contents of which are herein incorporated by reference.

This application also claims priority to U.S. Provisional Application No. 61/427,034, entitled "Preserving Quality of Service Across TRILL Networks," by inventors Shunjia Yu, Anoop Ghanwani, Phanidhar Koganti, John Michael Terry, Wing Cheung, Joseph Juh-En Cheng, and Surya P. Varanasi, the 23 Dec. 2010, the contents of which are herein incorporated by reference.

BACKGROUND

Technical Field

This disclosure relates to computer networking. More specifically, this disclosure relates to preserving quality of service across TRILL networks.

Related Art

Computer networks have become critical elements of a company's information technology infrastructure. The insatiable demand for bandwidth and the ever-increasing size and complexity of computer networks has created a need for increasing the bandwidth and improving the manageability of computer networks.

A company may have multiple offices that are spread over a large geographic area. The computer networks at these office locations may communicate with one other through a service provider's network. Implementing end-to-end Quality of Service (QoS) policies can help the company to utilize the network bandwidth more effectively and to improve manageability. Therefore, it is generally desirable to enable a company to implement end-to-end QoS policies.

SUMMARY

Some embodiments of the present invention provide systems and techniques for processing and/or forwarding packets. Specifically, some embodiments provide a QoS mapping mechanism configured to map a first set of QoS bits in a packet received from a customer (e.g., an Ethernet packet) to a second set of QoS bits for use in a Transparent Interconnection of Lots of Links (TRILL) which encapsulates the packet. The first set of QoS bits can be different from the second set of QoS bits. A system (e.g., a switch) can then generate a TRILL packet that includes the second set of bits.

The service provider's network, e.g., a TRILL network, may use a set of normalized QoS levels within the network. The mapping mechanism can enable the service provider to map the different QoS levels used in the different customer networks to a normalized set of QoS levels that is used within the service provider's network. Specifically, the second set of QoS bits may correspond to a normalized QoS level which is consistent with the QoS information contained in the packet that was received from the customer at the ingress switch.

At the egress switch, the TRILL packet can be decapsulated and the original packet with the original QoS bits can be forwarded to the customer's network. In this manner, some embodiments of the present invention can preserve the QoS bits across a TRILL network and enable customers to implement end-to-end QoS policies. In this disclosure, unless otherwise stated, the phrase "based on" means "based solely or partly on."

In some embodiments, the packet received from the customer can encapsulate an Internet Protocol (IP) packet, and the first set of QoS bits can include IP Differentiated Services Code Point (DSCP) bits in a header of the IP packet. In some embodiments, the packet received from the customer can include a VLAN (Virtual Local Area Network) tag, and the first set of QoS bits can include priority bits in the VLAN tag.

The TRILL packet can include an outer VLAN tag, and the second set of QoS bits can include priority bits in the outer VLAN tag. The second set of QoS bits can also include a drop eligibility indicator bit which is encoded into the Canonical Form Indicator (CFI) bit of the outer VLAN tag. Specifically, some embodiments can police the packets, and determine one or more bits in the second set of QoS bits (e.g., the drop eligibility indicator which is encoded as the CFI bit) based on the results of the policing.

Some embodiments provide a network which includes an ingress switch and an egress switch. The ingress switch can be configured to map a first set of QoS bits in a packet received from a customer to a second set of QoS bits for use in a TRILL packet which encapsulates the packet. The ingress switch can generate a TRILL packet that includes the second set of QoS bits. The network may also include one or more intermediate switches which are configured to process and/or forward the TRILL packet according to the second set of QoS bits. The egress switch can be configured to decapsulate the TRILL packet to obtain the original packet that was received from the customer. The egress switch can then send the original packet (with the original set of QoS bits) to the customer's network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

TRILL (Transparent Interconnection of Lots of Links)

TRILL combines the advantages of bridging and routing. Bridges (e.g., devices that perform layer-2 forwarding) can transparently connect multiple links to create a single local area network. Without TRILL, bridges use the spanning tree protocol (SIP) which restricts the topology on which traffic is forwarded to a tree to prevent loops. Unfortunately, forwarding the traffic over a tree causes traffic concentration on the links that correspond to the tree edges, leaving other links completely unutilized. Unlike bridges, Internet Protocol (IP) routers (e.g., devices that perform FP forwarding) do not need to create a spanning tree for forwarding traffic. However, routers that forward IP traffic require more configuration than bridges, and moving nodes in an IP network requires changing the IP address of the nodes. Each link in an IP network is associated with an address prefix, and all nodes on that link must have that IP prefix. If a node moves to another link that has a different IP prefix, the node must change its IP address. Unless otherwise stated, the term "FP" refers to both "IPv4" and "IPv6" in this disclosure.

A TRILL network includes "routing bridges" (referred to as RBridges) which route packets, but like bridges, learn layer-2 address locations through receipt of packets. Since packets are routed, packet forwarding is not limited to a spanning tree. Also, since a hop count is included in a TRILL packet, packets do not circulate forever in the network in the presence of loops. Further, since the layer-2 address locations are learned, a TRILL network allows IP nodes to move from one link to another in the network without any restrictions.

Figure 1:
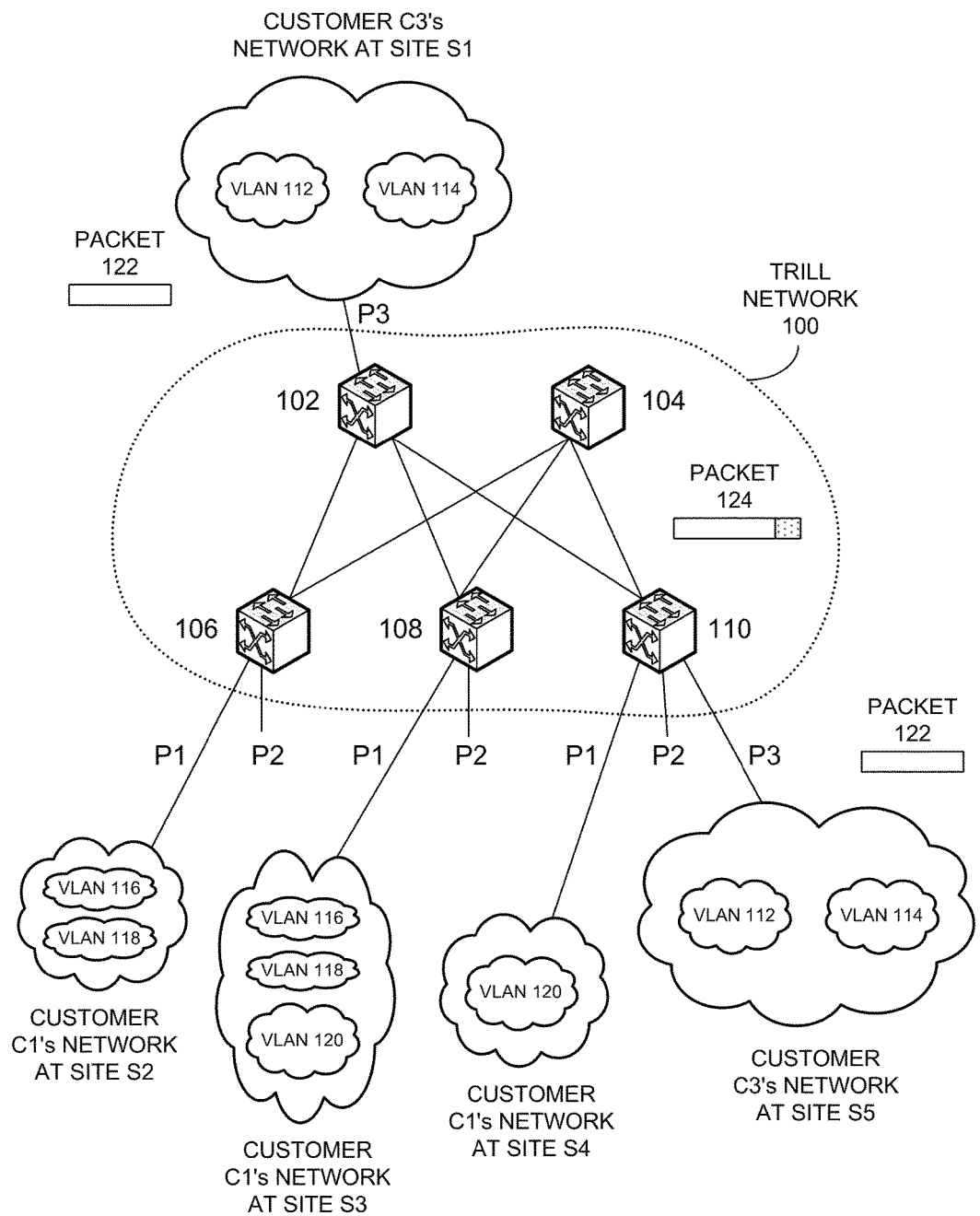
FIG. 1 illustrates a TRILL network in accordance with some embodiments of the present invention.

FIG. 1 illustrates a TRILL network in accordance with some embodiments of the present invention. TRILL network 100 can be a service provider's network which includes core RBridges 102 and 104 and edge RBridges 106, 108, and 110. RBridges 102, 106, 108, and 110 are coupled to customer devices, whereas RBridge 104 is not. Specifically, port P3 on RBridge 102 can be coupled to a device in customer C3's network at site S1; ports labeled P1 on RBridges 106, 108, and 110 can be coupled to devices in customer C1's networks at sites S2, S3, and S4, respectively; and port P3 on RBridge 110 can be coupled to a device in customer C3's network at site S5. Note that the port numbers in FIG. 1 match the customer numbers, i.e., ports labeled P1 are associated with customer C1, ports labeled P3 are associated with customer C3, etc. This has been done for ease of discourse. In general, any port on any RBridge can potentially be assigned to one or more virtual networks that are associated with one or more customers.

A virtual local area network (VLAN) in a customer's network may span multiple customer sites. For example, VLANs 112 and 114 in customer C3's network include nodes in sites S1 and S5. Similarly, VLANs 116 and 118 in customer C1's network include nodes in sites S2 and S3, and VLAN 120 in customer C1's network includes nodes in sites S3 and S4.

Nodes that belong to the same VLAN, but which are located at different sites, can communicate with each other transparently through TRILL network 100. Specifically, the ingress RBridge can encapsulate a packet (e.g., an Ethernet packet with or without one or more VLAN tags) received from a customer and route the packet within TRILL network 100 using a TRILL header. The egress RBridge can then strip the TRILL header and send the original customer packet on the appropriate port. For example, packet 122 can originate in customer C3's network at site S1, and be received on port P3 of RBridge 102 with a WAN tag associated with VLAN 112. Next, RBridge 102, which is the ingress RBridge for this packet, can encapsulate packet 122 by adding a TRILL header to obtain packet 124 (the TRILL header is the shaded portion in packet 124). Next, the TRILL header of packet 124 can be used to route packet 124 through TRILL network 100 until packet 124 reaches RBridge 110, which is the egress RBridge for the packet. RBridge 110 can then strip away the TRILL header on packet 124 to obtain the original packet 122, and send packet 122 on port P3 so that the packet can be delivered to the intended destination in VLAN 112 in customer C3's network at site S5. In FIG. 1, the packet that is received at the ingress RBridge and the packet that is sent from the egress RBridge are shown to be the same. However, these packets can be different. For example, if VLAN translation is being performed, then the packet that is received at the ingress RBridge and the packet that is sent from the egress RBridge can have different VLAN tags.

Details of the TRILL packet format and RBridge forwarding can be found in IETF draft "RBridges: Base Protocol Specification," available at http://tools.ietf.org/html/draft-ietf-trill-rbridge-protocol-16, which is incorporated herein by reference.

Although some examples in this disclosure are presented in the context of a TRILL network that includes RBridges, the present invention is not limited to TRILL networks or RBridges. The terms "frame" or "packet" generally refer to a group of bits. The use of the term "frame" is not intended to limit the present invention to layer-2 networks. Similarly, the use of the term "packet" is not intended to limit the present invention to layer-3 networks. Unless otherwise stated, the terms "frame" or "packet" may be substituted with other terms that refer to a group of bits, such as "cell" or "datagram."

Network Virtualization

Network virtualization enables a service provider to provision virtual networks (VNs) over a common network infrastructure. To a user on a VN it appears as if the traffic is being carried over a separate network that has been specifically built for the user. However, in reality, the traffic from multiple VNs may be carried over a common network infrastructure.

Network virtualization has many uses. For example, network virtualization can be used to create multiple, logically distinct networks on the same physical network to comply with government regulations. Other uses of network virtualization include, but are not limited to, partitioning network resources between different organizations in a company thereby reducing network costs and simplifying network management.

One approach for addressing the problem that is solved by network virtualization is to duplicate resources (e.g., routers, switches, etc.) in the network so that the resources can be provisioned on a per-customer basis. However, this approach is impractical because it is costly and it is not scalable.

Some embodiments of the present invention implement network virtualization and/or partitioning in the TRILL network by embedding, a VPN identifier in a TRILL option field in the TRILL header. Specifically, the ingress RBridge can determine a VPN identifier for each packet it receives from a customer, and embed the VPN identifier in a TRILL option field in the TRILL header. Next, the VPN identifier can be used to support network virtualization and/or partitioning in the TRILL network. Specifically, once the VPN identifier is embedded into the TRILL header, RBridges in the TRILL network can use the VPN identifier to determine how to handle the packet.

In some embodiments, the system can use a service provider VLAN identifier to implement network virtualization and/or partitioning. Specifically, ingress RBridges can add appropriate S-tags to packets received from customers (note that the S-tag based approach may not work for incoming packets that already have an S-tag). Next, the S-tag can be used to implement virtualization and/or partitioning in the network.

Packet Format

Figure 2:
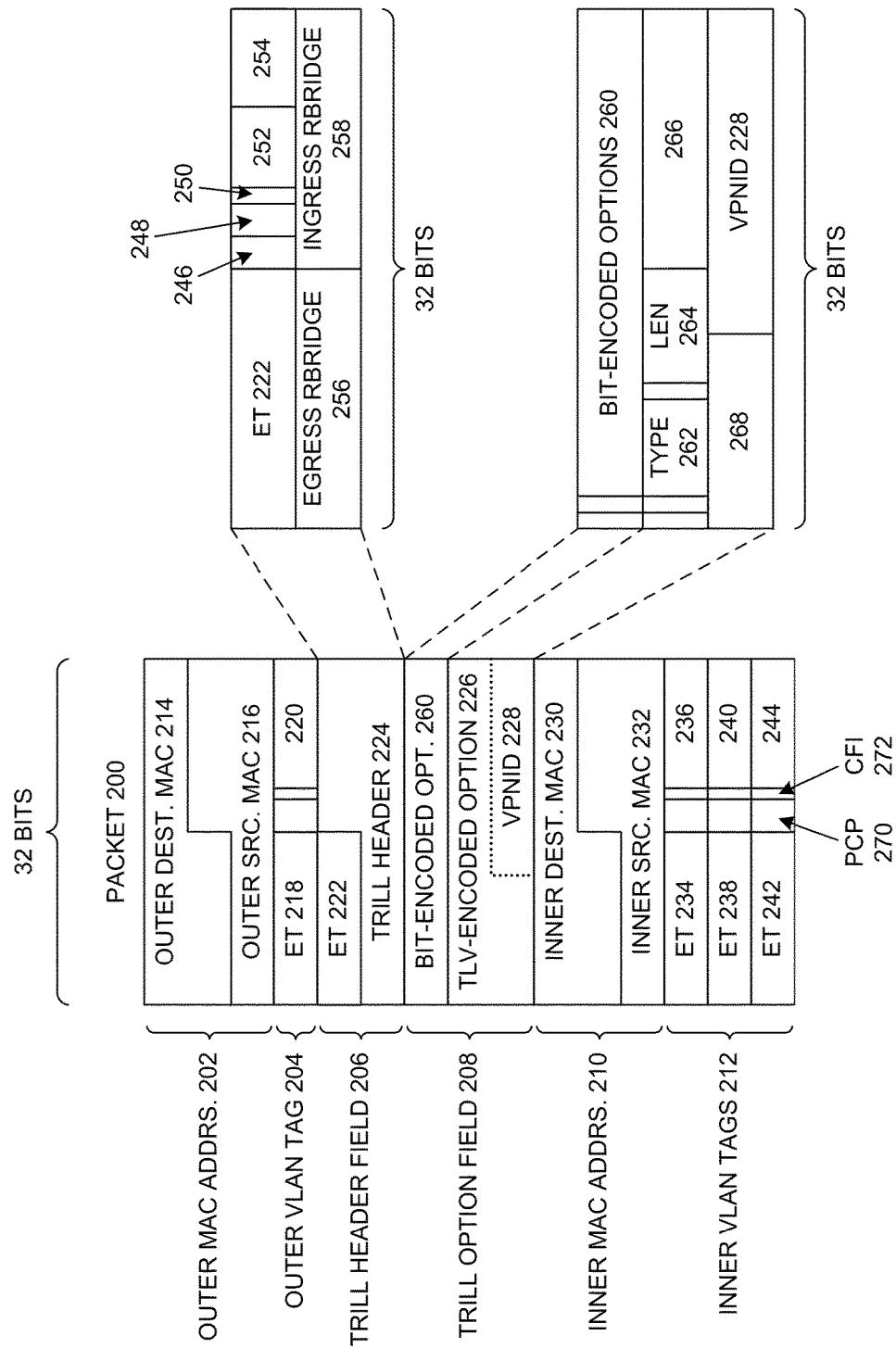
FIG. 2 illustrates a portion of an Ethernet packet which includes a TRILL header in accordance with some embodiments of the present invention.

FIG. 2 illustrates a portion of an Ethernet packet which includes a TRILL header in accordance with some embodiments of the present invention. The packet shown in FIG. 2 is for illustration purposes only, and is not intended to limit the present invention.

Packet 200 can include one or more of the following fields: outer MAC (medium access control) addresses 202, outer VLAN tag 204, TRILL header field 206, TRILL option field 208, inner MAC addresses 210, and inner VLAN tags 212. Typically, the packet is transmitted from top to bottom, i.e., the bits associated with outer MAC addresses 202 will appear on the transmission medium before the bits associated with outer VLAN tag 204 appear on the transmission medium, and so forth. The contents of these fields and their uses are discussed below.

Outer MAC addresses 202 can include outer destination MAC address 214 and outer source MAC address 216. These MAC addresses and outer VLAN tag 204 typically change at each TRILL hop as the packet traverses the service provider's network. Specifically, at each hop, outer source MAC address 216 is associated with the MAC address of the source node (e.g., RBridge) for that hop, outer destination MAC address 214 is associated with the MAC address of the destination node (e.g., RBridge) for that hop, and outer VLAN tag 204 is associated with the VLAN that includes the source node and the destination node for that hop.

Outer VLAN tag 204 can include Ethernet type field 218 and outer VLAN identifier 220. The value of Ethernet type field 218 can indicate that the next field is a VLAN identifier. VLAN identifier 220 can be used in the service provider's network to create multiple broadcast domains.

TRILL header field 206 can include Ethernet type field 222 and TRILL header 224. The value of Ethernet type field 222 can indicate that the next field is a TRILL header. TRILL header 224 can include information for routing the packet through a TRILL network that is embedded in the service provider's network. Specifically, as shown in FIG. 2, TRILL header 224 can include version field 246 which indicates the TRILL version, reserved field 248 which may be reserved for future use, multicast field 250 which indicates whether this packet is a multicast packet, TRILL option length 252 which indicates the length (in terms of 32-bit words) of any TRILL option field that follows the TRILL header, and hop count 254 which may be decremented at each RBridge as the packet traverses the service provider's network.

TRILL header 224 also includes egress RBridge nickname 256 and ingress RBridge nickname 258. Ingress RBridge nickname 258 corresponds to the ingress RBridge which receives the packet from the customer's network, and, for unicast packets, egress RBridge nickname 256 corresponds to the egress RBridge which sends the packet to the customer's network. For multicast packets, egress RBridge nickname 256 corresponds to the RBridge which is the root of the multicast tree on which the packet is to be forwarded.

For example, in FIG. 1, when packet 122 is received at ingress RBridge 102, ingress RBridge 102 can use the header information in packet 122 to determine that packet 122 needs to be routed to egress RBridge 110. Next, ingress RBridge 102 can add TRILL header field 206 to packet 122 to obtain packet 124. Specifically, RBridge 102 can set ingress RBridge nickname 258 in packet 124's TRILL header to RBridge 102's nickname, and set egress RBridge nickname 256 in packet 124's TRILL header to RBridge 110's nickname. RBridge 102 can then forward packet 124 based solely or partly on packet 124's TRILL header.

TRILL option field 208 can include bit-encoded options and one or more options encoded in a TLV (type-length-value) format. Specifically, TRILL option field 208 can include bit-encoded options 260 which are one-bit option flags, and TLV-encoded option 226. For example, a 20-bit VPN identifier can be encoded as a TLV-encoded option. Specifically, the value of type field 262 can indicate that this option specifies a VPN identifier. Length field 264 can indicate the length of the data portion of the TLV-encoded option in octets. In the packet shown in FIG. 2, TLV-encoded option 226 is used for specifying a 20-bit VPN identifier, and length field 264 is set to the value 0×6. The data portion of TLV-encoded option 226 begins immediately after length field 264. Specifically, in the packet shown in FIG. 2, the total length (in octets) of fields 266, 268, and 228 is equal to 0×6 as specified by length field 264. Further, as shown in FIG. 2, the last 20 bits of the data portion in TLV-encoded option 226 can be used for specifying VPN identifier 228.

Note that a 20-bit VPN identifier can be specified using a smaller data portion, e.g., only 0×3 octets instead of 0×6 octets. However, some embodiments use the following non-obvious insight: it may be desirable to align the 20-bit VPN identifier with the word boundary to simplify chip design and/or to improve performance. Thus, in some embodiments, 0×6 octets are used instead of 0×3 octets so that the 20-bit VPN identifier is aligned with a 32-bit word boundary. For example, as shown in FIG. 2, VPN identifier 228 is aligned with the 32-bit word boundary.

Inner MAC addresses 210 can include inner source MAC address 232 and inner destination MAC address 230. Inner MAC addresses 210 can be the MAC addresses that were present in the header of the packet that was received from the customer's network. For example, in FIG. 1, suppose a source node in VLAN 112 in customer C3's network at site S1 sends a packet to a destination node in VLAN 112 in customer C3's network at site S5. In this scenario, inner source MAC address 232 can correspond to the source node at site S1, and inner destination MAC address 230 can correspond to the destination node at site S5.

Inner VLAN tags 212 can include one or more VLAN tags. For example, inner VLAN tags 212 can include an S-tag which includes Ethernet type field 234 and S-VLAN-identifier 236, a C-tag which includes Ethernet type field 238 and C-VLAN-identifier 240, and another tag which includes Ethernet type field 242 and VLAN identifier 244. Each VLAN tag in outer VLAN tag 204 and inner VLAN tags 212 can also include a three-bit Priority Code Point (PCP) field (also referred to as the "priority" or "priority bits" in this disclosure), e.g., PCP 270, and a one-bit CFI field, e.g., CFI 272. When an S-tag is used, the CFI field can carry a drop eligibility indicator (DEI) bit. The values in Ethernet type fields (e.g., 234, 238, and 242) can indicate the type of VLAN tag that follows. For example, Ethernet type field 234 and 238 can indicate a VLAN identifier for an S-tag and a VLAN identifier for the C-tag follow the respective Ethernet type fields. The S-tag and the C-tag can be used by the customer to create a stacked-VLAN architecture, e.g., as defined in the Provider Bridging standard. The S-tag may also be used by the service provider to implement network virtualization and/or partitioning. Packet 200 can also include other tags, each tag having a tag-type field which indicates the type of the tag, and a field that stores contents (e.g., an identifier) related to the tag. For example, packet 200 can include a 32-bit congestion-notification-tag (CN-tag) which includes a 16-bit tag-type field and a 16-bit flow-identifier. The congestion-notification-tag may be used by the customer to manage network congestion.

Note that a packet may or may not include all of the fields shown in FIG. 2. For example, in some embodiments, a packet may not include one or more of inner VLAN tags 212 and/or outer VLAN tag 204. Further, certain combinations of fields may not be allowed in some embodiments. For example, in some embodiments, a packet may include either an S-tag or a TRILL option field, but not both. Additionally, the values of some fields may be related to each other. For example, in some embodiments, S-VLAN-identifier 236 may be copied into the 12 least significant bits of VPNID 278.

VLAN tagging is specified in IEEE (institute of Electrical and Electronics Engineers) standard IEEE 802.1Q. The earlier versions of the standard, including and up to IEEE 802.1Q-2005 of this standard describes how a single VLAN tag can be added to an Ethernet packet to create multiple broadcast domains within the same local area network (LAN). The term Provider Bridging refers to an amendment of this standard which allows an S-tag (a service VLAN tag is sometimes referred to as a provider tag) to be stacked in a single Ethernet packet. Provider Bridging enables a service provider to carry VLAN traffic from multiple customers on a shared network infrastructure without restricting the VLAN address space available to each customer. Further details on Provider Bridging can be found in the specification for standard IEEE 802.1ad.

In some embodiments, the system can add a TRILL header to a Provider Bridging packet. In these embodiments, the packet received from the customer network may include an S-tag. The service provider's network may then add a TRILL header to the packet. In some embodiments, the system may ensure that the priority bits in the outermost VLAN tag are the same as the priority bits in the S-tag.

Preserving Quality of Service (QoS) Across TRILL Networks

QoS refers to the ability of a switch and/or a network to meet the service requirements (e.g loss, delay, etc.) of its users (applications, data flows). This is typically done by providing different processing priorities and/or resources based on information contained in the packet. For example, QoS Objectives can be met by providing different priority levels to packets from different applications, users, or data flows. QoS is widely used to support applications which require certain performance guarantees from the network to operate as intended. For example, real-time streaming multimedia applications often rely on QoS features for proper operation.

In packet-switched networks, QoS information is often carried in one or more bits in the packet header. At each switch or node in the network, the QoS information in a packet can be used to determine how to process the packet. For example, the QoS bits may indicate a priority level of the packet and/or the drop eligibility of the packet. The switch may have different packet queues for different priority levels, and the switch may allocate more resources (e.g., more memory and processing time) for processing high-priority packets than for processing low-priority packets and may discard packets with a higher drop eligibility before packets with a lower drop eligibility during times of congestion.

Implementing end-to-end QoS policies can help a network administrator to utilize the network bandwidth more effectively. For example, a network administrator can use a network's QoS features to ensure that packets from delay-sensitive applications, e.g., real-time multimedia applications, are processed and/or forwarded in the network with a high priority.

To be effective, QoS typically needs to be implemented in an end-to-end fashion. For example, in FIG. 1, suppose customer C3 wishes to support a video conferencing application between sites S1 and S5. To this end, customer C3 may want video conferencing packets to be processed in the network with a higher priority than other packets. Customer C3 can configure its networks at sites S1 and S5 to ensure that video conferencing packets are processed accordingly. However, customer C3 may not be able to directly control how switches in TRILL network 100 will process the video conferencing packets. If TRILL network 100 does not process video conferencing packets with high priority, the video conferencing packets may experience an unacceptable amount of delay while traversing TRILL network 100, thereby defeating the whole purpose of using QoS for the video conferencing application.

One approach for implementing end-to-end QoS is to ensure that the QoS settings in the service provider's network (e.g., a TRILL network) are the same as the QoS settings in the client's network. Unfortunately, this approach is unlikely to work because the QoS settings of different clients may conflict with one another.

Some embodiments of the present invention provide systems and techniques for implementing end-to-end QoS even when different clients have different QoS requirements. Specifically, an ingress switch (e.g., an RBridge) can receive a packet from a customer network. For example, in FIG. 11, RBridge 106 can receive a packet from customer C1's network at site S2. Next, the ingress switch can map the QoS bits in the customer packet to another set of QoS bits for use in a TRILL packet which encapsulates the customer packet. The ingress switch can generate the TRILL packet that includes the second set of QoS bits. The service provider can define a set of standardized QoS levels within the network, and map the QoS bits in the customer's packet to an appropriate QoS level within the network. Note that the set of QoS bits in the TRILL packet can be different from the QoS bits in the customer packet. Further note that the QoS bits in the customer packet are preserved because these bits are not modified.

Additionally the service provider may wish to police the customer traffic entering the service provider network and mark packets "out of profile" with a higher drop eligibility so that they may be discarded before other packets that have a lower drop eligibility during times of network congestion.

Once the QoS bits have been mapped, the ingress switch can send the TRILL packet to the egress switch(es). At each hop, the TRILL packet can be processed in accordance with the QoS bits in the TRILL packet. Finally, once the TRILL packet reaches the egress switch, the egress switch can strip away the TRILL header and send the packet which contains the original QoS bits to the customer's network. For example, in FIG. 1, ingress RBridge 106 can send a TRILL packet to egress RBridge 110 via RBridge 104. At RBridge 104, the TRILL packet can be processed in accordance with the QoS bits in the TRILL packet. Finally, egress RBridge 110 can strip away the TRILL header from the TRILL packet and send the packet which contains the original QoS bits to customer C1's network at site S4.

Figure 3:
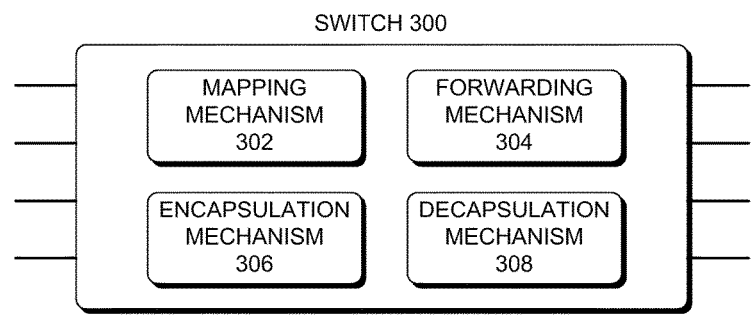
FIG. 3 illustrates a switch in accordance with some embodiments of the present invention.

FIG. 3 illustrates a switch in accordance with some embodiments of the present invention.

Switch 300 can include a plurality of mechanisms which may communicate with one another via a communication channel, e.g., a bus. Switch 300 may be realized using one or more integrated circuits. In some embodiments, switch 300 includes mapping mechanism 302, forwarding mechanism 304, encapsulation mechanism 306, and decapsulation mechanism 308. In some embodiments, these mechanisms may be implemented as functional blocks in an application-specific integrated circuit. FIG. 3 is for illustration purposes only, and is not intended to limit the present invention to the forms disclosed. Specifically, in some embodiments, switch 300 may not be an RBridge, and/or may include fewer or more mechanisms than those shown in FIG. 3.

Forwarding mechanism 304 may be configured to forward a packet based on information contained in the packet header. Specifically, forwarding mechanism 304 may determine the outgoing port by performing a look-up in a content addressable memory using data fields (e.g., MAC addresses, VLAN tags, RBridge nicknames, etc.) in the packet header.

At the ingress switch, encapsulation mechanism 306 may be configured to encapsulate an Ethernet packet (which may include one or more VLAN tags) in a TRILL, packet by adding a TRILL header. The Ethernet packet header can be used to determine the TRILL header that needs to be added to the Ethernet packet and the port over which the TRILL packet is to be sent. Once the TRILL header has been added, the TRILL packet can be sent through the outgoing port. At the egress switch, decapsulation mechanism 308 may be configured to strip away the TRILL header.

Mapping mechanism 302 may be configured to map a first set of QoS bits in the Ethernet packet received from a customer to a second set of QoS bits for use in the TRILL header. The TRILL header may be created before or after mapping mechanism 302 generates the second set of bits. The service provider's network (e.g., TRILL network 100) may use a set of normalized QoS levels. Mapping mechanism 302 may select a normalized QoS level which is consistent with the QoS information contained in the original Ethernet packet.

Figure 4:
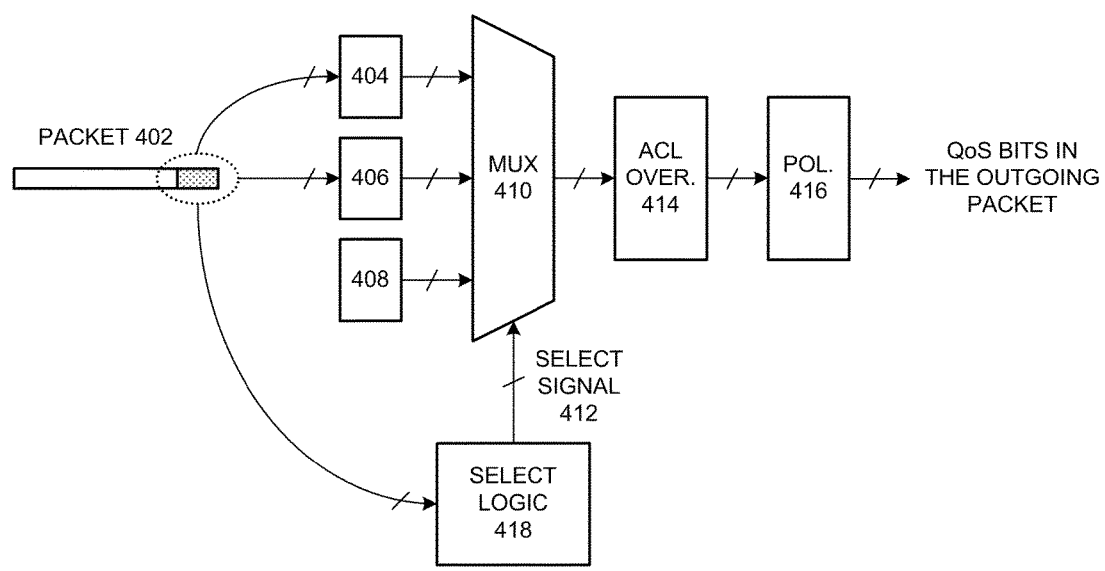
FIG. 4 illustrates an exemplary mapping mechanism in accordance with some embodiments of the present invention.

FIG. 4 illustrates an exemplary mapping mechanism in accordance with some embodiments of the present invention.

The exemplary mapping mechanism illustrated in FIG. 4 can include one or more hardware and/or software modules. Specifically, the mapping mechanism can include one or more QoS mapping tables, such as tables 404 and 406, and a set of registers, such as registers 408. A look-up can be performed on tables 404 and 406 based on different sets of QoS bits from incoming packet 402 (which can be an Ethernet packet). For example, the look-up on table 404 may be performed using QoS bits from the outermost VLAN tag in packet 402, whereas the look-up on table 406 may be performed using Internet Protocol (IP) Differentiated Services Code Point (DSCP) bits from a header of an IP packet that is encapsulated within packet 402. Registers 408 may provide a default set of QoS bits which may be used in lieu of the outputs from tables 404 or 406.

The result of the lookup can be a set of QoS bits which correspond to a normalized set of QoS levels that are used within the service provider's network. In some embodiments, the result of the look-up can be a three-bit priority level, a six-bit IP DSCP value, a two-bit drop precedence value, and/or a one-bit drop eligibility indicator. The drop precedence value and drop eligibility indicator can be used to modify the probability that the packet will be dropped during congestion. Specifically, the drop precedence value indicates that the packet was over the committed rate allowed during policing, and hence, the packet may be dropped during congestion. In some embodiments, the CFI bit in a VLAN tag is used to carry the drop eligibility indicator which indicates that the packet was over its quota, and therefore, can be dropped during congestion.

The lookup results from the one or more tables and/or registers can be provided as input to multiplexer 410. Select signal 412 can be provided as a control input to multiplexer 410 to control the set of inputs that multiplexer 410 couples with its outputs. Select signal 412 may be generated by select logic 418, which may receive header information from packet 402 as one of the inputs.

In some embodiments, select logic 418 can determine if packet 402 encapsulates an IP packet and if the DSCP bits should be used for determining QoS. If so, select logic 418 can generate select signal 412 to cause multiplexer 410 to output the lookup results from table 406. If packet 402 does not encapsulate an IP packet, or if the DSCP bits are not trustable, then select logic 418 can determine whether packet 402 includes one or more VLAN tags (e.g., a C-tag, an S-tag, or both). If so, select logic 418 can generate select signal 412 to cause multiplexer 410 to output the lookup results from table 404. If packet 402 does not encapsulate an IP packet, or if the DSCP bits are not trustable, and if packet 402 also does not include a VLAN tag, select logic 418 can generate select signal 412 to cause multiplexer 410 to output the default QoS bit values stored in registers 408.

The output of multiplexer 410 can be provided as input to access control list (ACL) override 414. ACL override 414 can be used to override the QoS bits that were determined by the mapping tables based on any ACLs that are configured on the switch. For example, ACL override 414 can enable a user to force certain packets (e.g., packets of a particular flow) to have a particular QoS level regardless of the values of the QoS bits in the packet header. In some embodiments, ACL override 414 can be implemented using a tertiary content addressable memory. Note that ACL override 414 may receive header information of packet 402 as input (not shown in FIG. 4) for determining whether or not to override the QoS bits.

The output from ACL override 414 can then be provided to policer 416. Policer 416 can help to enforce the QoS policies defined in the network. Specifically, policer 416 can adjust the QoS bits of packets in a packet flow if the flow is violating its service profile. For example, if the packet is part of a packet flow that is using more bandwidth than what was allocated to the flow, policer 416 can adjust the drop precedence of the packet to increase the probability that the packet will be dropped during congestion. The output of policer 416 can then be used in the outgoing packet. For example, if the outgoing packet is a TRILL packet which encapsulates packet 402, then the QoS bits in the outer VLAN tag (e.g., outer VLAN tag 204 in FIG. 2) can be set using the output of policer 416.

Note that the original QoS bits may be preserved in one of the inner VLAN tags (e.g., the outermost WAN tag in VLAN tags 212 in FIG. 2) or in the IP header. In such cases, at the egress switch the outer VLAN tag is stripped off, and the packet is forwarded to the customer's network with the original QoS bits which were preserved in one of the inner ULAN tags and/or IP header. In some embodiments, the system may modify the original QoS bits. In these embodiments, the system may modify the original QoS bits at the egress switch before forwarding the packet to the customer's network.

Figure 5:
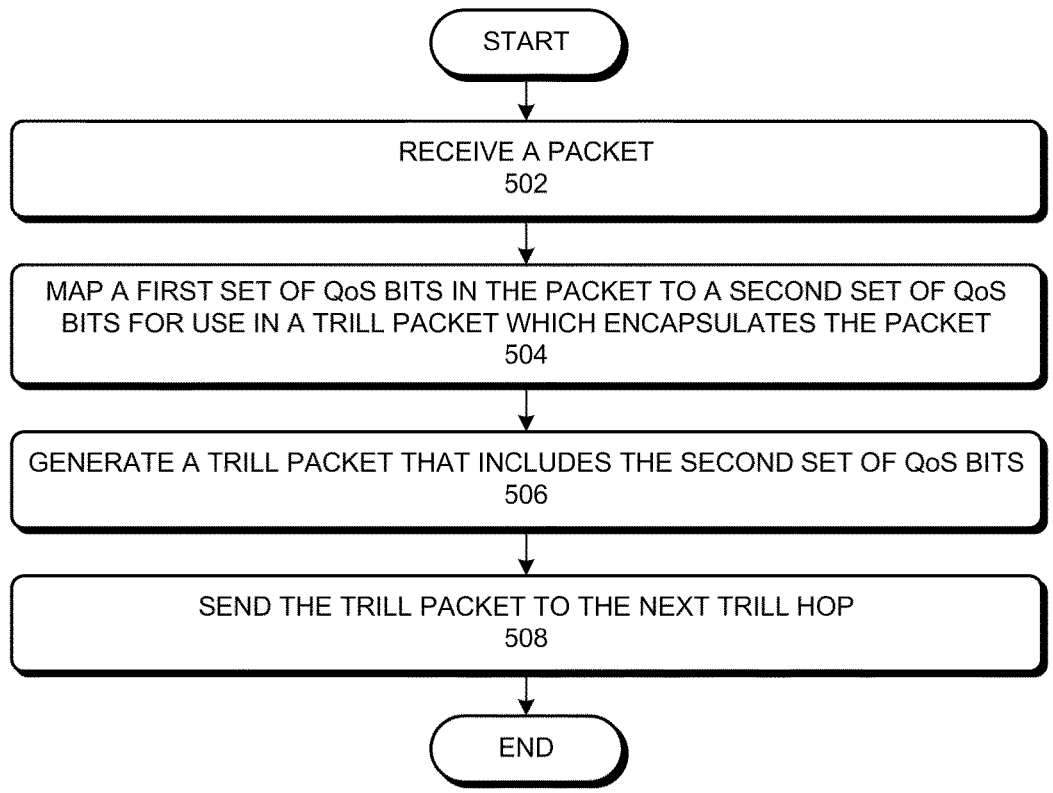
FIG. 5 presents a flowchart that illustrates a process for processing packets in accordance with some embodiments of the present invention.

FIG. 5 presents a flowchart that illustrates a process for processing packets in accordance with some embodiments of the present invention.

The process can begin with a system receiving a packet (operation 502). Next, the system can map a first set of QoS bits in the packet to a second set of QoS bits for use in a TRILL packet which encapsulates the packet (operation 504). Note that these two sets of QoS bits can be different from each another (i.e., these two sets may not be copies of each other). The first set of QoS bits can be priority bits in the outermost tag in the set of inner VLAN tags, e.g., inner VLAN tags 212 in FIG. 2. Alternatively, the first set of QoS bits can be IP DSCP bits in a header of an IP packet that is encapsulated within the packet. The second set of QoS bits can be the priority bits in the outer VLAN tag, e.g., outer VLAN tag 204 in FIG. 2. Once the second set of QoS bits have been determined, the system can generate a TRILL packet that includes the second set of QoS bits (operation 506). The system can then send the TRILL packet to the next TRILL hop (operation 508).

Figure 6:
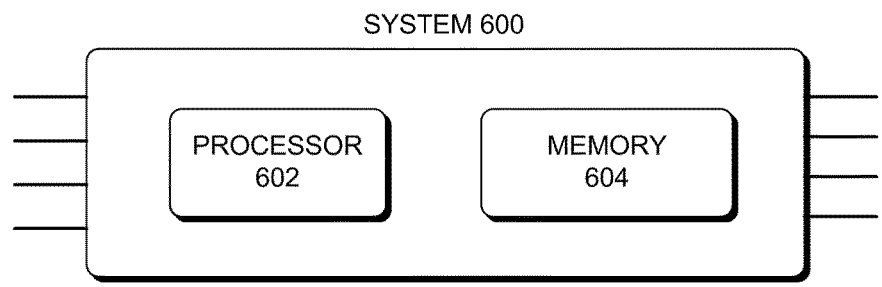
FIG. 6 illustrates a system in accordance with some embodiments of the present invention.

FIG. 6 illustrates a system in a accordance with some embodiments of the present invention.

System 600 can include processor 602 (e.g., a generic or network processor) and memory 604. Processor 602 may be capable of accessing and executing instructions stored in memory 604. For example, processor 602 and memory 604 may be coupled by a bus. Memory 604 may store instructions that when executed by processor 602 cause system 600 to perform the process illustrated in FIG. 5. Specifically, in some embodiments, memory 604 may store instructions for mapping a first set of QoS bits in a packet to a second set of QoS bits for use in a packet which encapsulates the first packet, wherein the first set of QoS bits is different from the second set of QoS bits.

The data structures and code described in this disclosure can be partially or fully stored on a non-transitory computer-readable storage medium and/or a hardware module and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes.

The methods and processes described in this disclosure can be partially or fully embodied as code and/or data stored in a computer-readable storage medium or device, so that when a computer system reads and/or executes the code and/or data, the computer system performs the associated methods and processes. The methods and processes can also be partially or fully embodied in hardware modules or apparatuses, so that when the hardware modules or apparatuses are activated, they perform the associated methods and processes. Further, the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A switch in a network of interconnected switches, comprising: mapping circuitry configured to map a first set of Quality of Service (QoS) bits in a first packet from a first client and a second set of QoS bits in a second packet from a second client to a third set of QoS bits, wherein the first packet encapsulates an Internet Protocol (IP) packet, wherein the third set of QoS bits represents standardized QoS levels for an encapsulation header for the network of interconnected switches, and wherein the first, second, and third sets of QoS bits are different from one another; encapsulation circuitry configured to: encapsulate the first packet with a first encapsulation header, which includes a first Virtual Local Area Network (VLAN) tag comprising the third set of QoS bits; and encapsulate the second packet with a second encapsulation header, which includes a second VLAN tag comprising the third set of QoS bits; and forwarding circuitry configured to: determine a first egress port for the first packet based on the first encapsulation header and a second egress port for the second packet based on the second encapsulation header; and initiate forwarding via the first and second egress ports.

2. The switch of claim 1, wherein the first or second VLAN tag is an outer VLAN tag.

3. The switch of claim 1, wherein the first set of QoS bits includes IP Differentiated Services Code Point (DSCP) bits in a header of the IP packet.

4. The switch of claim 1, wherein the first packet includes an inner VLAN tag and the first set of QoS bits includes priority bits in the inner VLAN tag.

5. The switch of claim 1, wherein the third set of QoS bits includes a Canonical Form Indicator (CFI) bit, which encodes drop eligibility information.

6. A system, comprising: a processor; and a memory storing instructions that when executed by the processor cause the system to: map a first set of Quality of Service (QoS) bits in a first packet from a first client and a second set of QoS bits in a second packet from a second client to a third set of QoS bits, wherein the first packet encapsulates an Internet Protocol (IP) packet, wherein the third set of QoS bits represents standardized QoS levels for an encapsulation header for the network of interconnected switches, and wherein the first, second, and third sets of QoS bits are different from one another, encapsulate the first packet with a first encapsulation header, which includes a Virtual Local Area Network (VLAN) tag comprising the third set of QoS bits; and encapsulate the second packet with a second encapsulation header, which includes a second VLAN tag comprising the third set of QoS bits; ; and forwarding circuitry configured to: determine a first egress port for the first packet based on the first encapsulation header and a second egress port for the second packet based on the second encapsulation header; and initiate forwarding via the first and second egress ports.

7. The system of claim 6, wherein the first or second VLAN tag is an outer VLAN tag.

8. The system of claim 6, wherein the first set of QoS bits includes IP Differentiated Services Code Point (DSCP) bits in a header of the IP packet.

9. The system of claim 6, wherein the first packet includes an inner VLAN tag and the first set of QoS bits includes priority bits in the inner VLAN tag.

10. The system of claim 6, wherein the third set of QoS bits includes a Canonical Form Indicator (CFI) bit, which encodes drop eligibility information.

11. A non-transitory computer-readable medium storing instructions which when executed by a computer cause the computer to perform a method the method comprising: mapping a first set of Quality of Service (QoS) bits in a first packet from a first client and a second set of QoS bits in a second packet from a second client to a third set of QoS bits, wherein the packet encapsulates an Internet Protocol (IP) packet, wherein the third set of QoS bits represents standardized QoS levels for an encapsulation header for the network of interconnected switches, and wherein the first, second, and third sets of QoS bits are different from one another; encapsulating the first packet with a first encapsulation header, which includes a first Virtual Local Area Network (VLAN) tag comprising the third set of QoS bits, and encapsulating the second packet with a second encapsulation header, which includes a second VLAN tag comprising the third set of QoS bits; forwarding circuitry configured to: determine a first egress port for the first packet based on the first encapsulation header and a second egress port for the second packet based on the second encapsulation header; and initiate forwarding via the first and second egress ports.

12. The non-transitory computer-readable medium of claim 11, wherein the first packet and the second packets are generated from a customer's network located at a first site and are destined to the customer's network located at a second site.

13. The non-transitory computer-readable medium of claim 11, wherein the first packet and the second packet are encapsulated based on a same protocol.

14. The non-transitory computer-readable medium of claim 11, wherein the first or second VLAN tag is an outer VLAN tag.

15. The non-transitory computer-readable medium of claim 11, wherein the first set of QoS bits includes IP Differentiated Services Code Point (DSCP) bits in a header of the IP packet.

16. The non-transitory computer-readable medium of claim 11, wherein the first packet includes an inner VLAN tag and the first set of QoS bits includes priority bits in the inner VLAN tag.

17. The non-transitory computer-readable medium of claim 11, wherein the third set of QoS bits includes a Canonical Form Indicator (CFI) bit, which encodes drop eligibility information.

18. A method, comprising: mapping, by a switch, a first set of Quality of Service (QoS) bits in a first packet from a first client and a second set of QoS bits in a second packet from a second client to a third set of QoS bits, wherein the first packet encapsulates an Internet Protocol (IP) packet, wherein the third set of QoS bits represents standardized QoS levels for an encapsulation header for the network of interconnected switches, and wherein the first, second, and third sets of QoS bits are different from one another; encapsulating the first packet with a first encapsulation header, which includes a first Virtual Local Area network (VLAN) tag comprising the third set of QoS bits; and encapsulating the second packet with a second encapsulation header, which includes a second VLAN tag comprising the third set of QoS bits; forwarding circuitry configured to: determine a first egress port for the first packet based on the first encapsulation header and a second egress port for the second packet based on the second encapsulation header; and initiate forwarding via the first and second egress ports.

19. The method of claim 18, wherein the first or second VLAN tag is an outer VLAN tag.

20. The method of claim 18, wherein the first set of QoS bits includes IP Differentiated Services Code Point (DSCP) bits in a header of the IP packet.

21. The method of claim 18, wherein the first packet includes an inner VLAN tag and the first set of QoS bits includes priority bits in the inner VLAN tag.

22. The method of claim 18, wherein the third set of QoS bits includes a Canonical Form Indicator (CFI) bit, which encodes drop eligibility information.

* * * * *